United States Patent
Singhal et al.

(10) Patent No.: US 11,348,150 B2
(45) Date of Patent: May 31, 2022

(54) SYSTEMS AND METHODS FOR FACILITATING CARD VERIFICATION OVER A NETWORK

(71) Applicant: PayPal, Inc., San Jose, CA (US)

(72) Inventors: Nitesh Singhal, Sunnyvale, CA (US); Parijat Sinha, San Jose, CA (US); Nitin Agarwal, Adyar (IN); Muthukumar Murugesan, Thiruvottriyur (IN)

(73) Assignee: PayPal, Inc., San Jose, CA (US)

( * ) Notice: Subject to any disclaimer, the term of this patent is extended or adjusted under 35 U.S.C. 154(b) by 77 days.

(21) Appl. No.: 16/653,993

(22) Filed: Oct. 15, 2019

(65) Prior Publication Data

US 2020/0104846 A1    Apr. 2, 2020

Related U.S. Application Data

(63) Continuation of application No. 15/392,078, filed on Dec. 28, 2016, now abandoned, which is a
(Continued)

(51) Int. Cl.
*G06Q 30/00* (2012.01)
*G06Q 30/06* (2012.01)
(Continued)

(52) U.S. Cl.
CPC ......... *G06Q 30/0609* (2013.01); *G06F 21/34* (2013.01); *G06Q 20/12* (2013.01);
(Continued)

(58) Field of Classification Search
CPC ...... G06Q 20/409; G06Q 20/12; G06Q 20/40; G06Q 40/12; G06Q 30/0609;
(Continued)

(56) References Cited

U.S. PATENT DOCUMENTS 4,734,564 A   3/1988   Boston et al.
6,327,578 B1  12/2001  Linehan
(Continued)

FOREIGN PATENT DOCUMENTS

WO   WO-0122374 A1 *  3/2001  ............. G06Q 20/02
WO   WO-02071176 A2 * 9/2002  ......... G06Q 20/4037

OTHER PUBLICATIONS

"Understanding Risk Management in Emerging Retail Payments," by Michele Braun, James McAndrews, William Roberds, and Richard Sullivan, FRBNY Economic Policy Review, Sep. 2008 (Year: 2008).*

(Continued)

*Primary Examiner* — Anne M Georgalas (57) ABSTRACT

A system and method for facilitating electronic commerce over a network, according to one or more embodiments, includes communicating with a user via a user device and an issuer of payment media via an issuer device over the network, the payment media being issued to the user by the issuer, receiving user instruction over the network to link the payment media to a user account related to the user, prompting the user over the network to input a secure password known only by the issuer and the user, receiving the secure password from the user over the network, verifying that the payment media is owned by the user over the network via a secure protocol, returning a response to the user related to verification of the payment media, and storing payment media verification information.

18 Claims, 5 Drawing Sheets

Related U.S. Application Data continuation of application No. 12/819,774, filed on Jun. 21, 2010, now abandoned.

(51) Int. Cl.
*G06Q 20/40* (2012.01)
*G06Q 20/12* (2012.01)
*G06Q 40/00* (2012.01)
*G06F 21/34* (2013.01)
*H04L 9/40* (2022.01)

(52) U.S. Cl.
CPC ........... *G06Q 20/40* (2013.01); *G06Q 20/409* (2013.01); *G06Q 30/06* (2013.01); *G06Q 30/0635* (2013.01); *G06Q 40/12* (2013.12); *H04L 63/083* (2013.01)

(58) Field of Classification Search
CPC .... G06Q 30/0635; G06Q 30/06; G06F 21/34; H04L 63/083
See application file for complete search history.

(56) References Cited

U.S. PATENT DOCUMENTS

| | | | |
|---|---|---|---|
| 7,409,369 B1 | 8/2008 | Homuth et al. | |
| 7,499,889 B2* | 3/2009 | Golan | G06Q 20/04 |
| | | | 705/40 |
| 7,827,115 B2* | 11/2010 | Weller | G06Q 20/367 |
| | | | 705/78 |
| 8,317,090 B2* | 11/2012 | Wiesman | G06Q 20/10 |
| | | | 235/379 |
| 2002/0035548 A1 | 3/2002 | Hogan et al. | |
| 2002/0091646 A1* | 7/2002 | Lake | G06Q 20/342 |
| | | | 705/67 |
| 2003/0200184 A1* | 10/2003 | Dominguez | G07F 7/10 |
| | | | 705/78 |
| 2004/0254848 A1 | 12/2004 | Golan et al. | |
| 2005/0102234 A1* | 5/2005 | Devine | G06Q 20/40 |
| | | | 705/44 |
| 2005/0246278 A1* | 11/2005 | Gerber | G06Q 20/02 |
| | | | 705/44 |
| 2005/0250538 A1 | 11/2005 | Narasimhan et al. | |
| 2005/0289052 A1* | 12/2005 | Wankmueller | G06Q 30/06 |
| | | | 705/40 |
| 2006/0149671 A1 | 7/2006 | Nix et al. | |
| 2007/0244831 A1 | 10/2007 | Kuo | |
| 2008/0103972 A1 | 5/2008 | Lanc | |
| 2008/0172306 A1* | 7/2008 | Schorr | G06Q 20/40 |
| | | | 705/26.41 |
| 2008/0301057 A1 | 12/2008 | Oren | |
| 2011/0078072 A1* | 3/2011 | Ganjigunta | G06Q 20/24 |
| | | | 705/38 |
| 2011/0093397 A1* | 4/2011 | Carlson | G06Q 10/10 |
| | | | 705/67 |
| 2011/0145152 A1* | 6/2011 | McCown | G06Q 20/10 |
| | | | 705/67 |
| 2011/0178926 A1* | 7/2011 | Lindelsee | G06Q 20/40 |
| | | | 705/44 |

OTHER PUBLICATIONS

"The smart cards are coming . . . really: you've heard it before, but this time technological demands and security demands in a post 9-11 world make the move to smart cards more likely," by Peter Piazza, Security Management 49.1: 40(12), American Society for Industrial Security, Jan. 2005 (Year: 2005).*

* cited by examiner

SYSTEMS AND METHODS FOR FACILITATING CARD VERIFICATION OVER A NETWORK

The present application is a continuation of U.S. application Ser. No. 15/392,078, filed Dec. 28, 2016, which is a continuation of U.S. application Ser. No. 12/819,774, filed Jun. 21, 2010; the disclosures of each of the above-referenced applications are incorporated by reference herein in their entireties.

BACKGROUND

Technical Field

The present invention generally relates to facilitating electronic commerce over a network and, more particularly, to facilitating card verification over a network.

Related Art

In online financial transactions, users typically search for and purchase products and services through electronic communications with online merchants over electronic networks, such as the Internet. When shopping at a particular website, users select items to purchase by clicking on a link for a specific item. The selected items are placed on reserve in some form of virtual shopping cart. When done shopping, the user is directed to checkout and prompted to provide some form of payment for the selected items. At this point, the user may access an online account with a service provider to provide payment for selected items.

Some service providers accept debit cards and credit cards as a payment reserve for online purchase requests. In some instances, service providers may store debit and credit card numbers with a user account and access the stored card numbers when the user requests payment for online purchases. For some service providers, verifying card numbers may not be considered a real-time process and may take anywhere from 3-30 days to complete card verification depending on various circumstances, such as response time of the card issuing bank, transaction history of the user, and perceived risk of the user. Generally, non-real-time card verification may cause lower completion rates, low user comprehension, high volume of customer service calls, and declines in transaction processing.

As such, there exists a need to provide a more efficient approach to card verification for network based transactions. Moreover, there exists a need to improve handling of user card verification for online transactions.

SUMMARY

To overcome deficiencies of conventional card verification techniques, the present disclosure provides a card verification system and process adapted to instantly verify or not verify payment media, such as debit cards and/or credit cards. The card verification system and process may be implemented by a merchant as, for example, a choice for payment. The card verification system and process may provide a means for a service provider to establish a working relationship with various merchants over a network.

Embodiments of the present disclosure provide systems and methods for facilitating electronic commerce including facilitating card verification over a network. The systems and methods include communicating with a user via a user device and an issuer of payment media via an issuer device over the network, the payment media being issued to the user by the issuer, receiving user instruction over the network to link the payment media to a user account related to the user, prompting the user over the network to input a secure password known only by the issuer and the user, receiving the secure password from the user over the network, verifying that the payment media is owned by the user over the network via a secure protocol, returning a response to the user related to verification of the payment media, and storing payment media verification information.

In various implementations, the systems and methods may include receiving a purchase request from the user via the user device over the network, prompting the user to login over the network after receiving the purchase request from the user via the user device over the network, receiving user information including user identity information from the user via the user device over the network, verifying the identity of the user based on the user information, verifying the user account is related to the user based on the verified identify of the user, processing the purchase request, and storing transaction information related to the processed purchase request including payment media verification information.

In various implementations, the systems and methods may include receiving user instruction over the network to initiate payment media verification, prompting the user over the network to select a task for processing over the network, receiving user instruction over the network to link the payment media to the user account related to the user, and receiving user instruction over the network for selection of payment media verification.

In various implementations, the secure protocol obliges the issuer to verify that the secure password is related to the user and the payment media is related to the user. The secure password comprises a 3DSecure password, and the secure protocol comprises 3DSecure protocol. The payment media comprises at least one of a debit card and a credit card issued to the user by the issuer. The issuer comprises a financial entity, such as a banking institution, adapted to issue the payment media to the user. The transaction information including payment media verification information is stored as part of the user account, and the user account includes identification information related to the user.

These and other aspects of the present disclosure will be more readily apparent from the detailed description of the embodiments set forth below taken in conjunction with the accompanying drawings.

Embodiments of the invention and their advantages are best understood by referring to the detailed description that follows.

DETAILED DESCRIPTION

Embodiments of the present disclosure provide systems and methods for facilitating electronic commerce including card verification over a network. In one implementation, card verification refers to a process of verifying a card (e.g., debit card, credit card, etc.) added to a user account belongs to the owner of the user account. The card verification process may be utilized to verify a user account and/or lift account limits for the user account. The card verification process may be utilized by a transaction service provider when a risk policy determines that the card needs to be verified (e.g., verified that the user is the owner of the card) before the card is utilized in financial transactions involving the transaction service provider. In some instances, card verification is utilized to lift or raise account limits (e.g., spending limits for a user purchase account) and enable a service user to have higher sending, receiving, and/or withdrawal capabilities. In one aspect, the card verification process may be utilized as a real-time process and may be referred to as instant card verification, which may result in higher completion rates for purchases, improved user comprehension, reduced volume of customer service calls, and increased transactions over the network. In another aspect, the process of instant card verification may improve the user experience when interacting with the transaction service provider.

In accordance with an embodiment of the present disclosure, the card verification process enables instant card verification using a secure protocol (e.g., 3DSecure protocol), which utilizes a secure authentication to instantly verify a user's card (e.g., debit card and/or credit card). The card verification process may be adapted to process the card verification process in a short interval (e.g., in minutes) as opposed to a multiple days for conventional card verification practices and techniques. In various implementations, the card verification process may enhance user experiences by enabling service users to instantly lift account limits for financial transactions over a network, such as the Internet.

In accordance with an embodiment of the present disclosure, a service provider is adapted to provide online authentication of a user's card (e.g., debit card and/or credit card) using the secure protocol and leverage the result of the online authentication to validate and confirm the user's card. In some instances, the secure protocol may be utilized to approve a user's card at the time of an online transaction. However, in other instances, the service provider is adapted to authenticate the user's card prior to processing an online transaction and store the results of authentication for future online transactions. These and other aspects of the present disclosure are described in greater detail herein.

Figure 1:
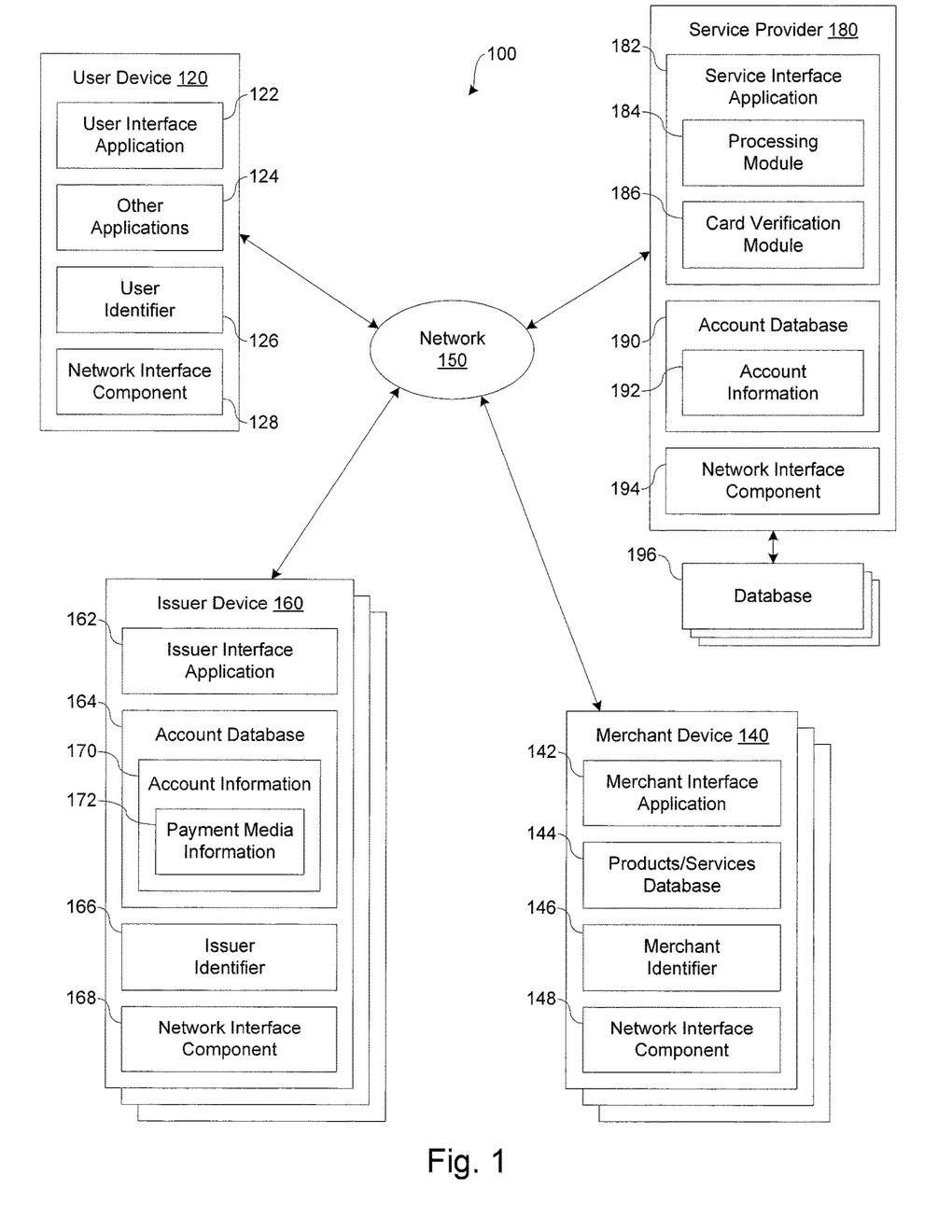
FIG. 1 shows a block diagram of a system adapted to facilitate electronic commerce including card verification over a network, in accordance with embodiments of the present disclosure.

FIG. 1 shows one embodiment of a system 100 adapted for facilitating electronic commerce including card verification over a network 150, such as the Internet and/or a mobile communication network. As shown in FIG. 1, the system 100 includes a user device 120 (e.g., a client, customer, or consumer device) adapted to interface with one or more merchant devices 140 (e.g., one or more business entities proffering items, products, and/or services for purchase), one or more issuer devices 160 (e.g., one or more financial entities adapted to issue payment media, such as banking institutions), and a service provider 180 (e.g., a network based transaction service provider, such as a payment processing and/or settlement transaction provider) over the network 150.

The network 150, in one embodiment, may be implemented as a single network or a combination of multiple networks. For example, the network 150 may include a wireless telecommunications network (e.g., cellular telephone network) adapted for communication with one or more other communication networks, such as the Internet. In other examples, the network 150 may include the Internet, one or more intranets, landline networks, wireless networks, and/or one or more other appropriate types of communication networks. As such, in various implementations, the user device 120, the one or more merchant devices 140, the one or more issuer devices 160, and the service provider 180 may be associated with a particular link (e.g., a link, such as a URL (Uniform Resource Locator) to an IP (Internet Protocol) address).

The user device 120, in various embodiments, may be implemented using any appropriate combination of hardware and/or software configured for wired and/or wireless communication over the network 150. In one embodiment, the user device 120 may be implemented as a mobile communication device (e.g., wireless cellular phone) adapted for communication with the network 150. In other embodiments, the user device 120 may be implemented as a personal computer (PC), a personal digital assistant (PDA), a notebook computer, and/or various other generally known types of wired and/or wireless computing devices for communication with the network 150. It should be appreciated that the user device 120 may be referred to as a client device or a customer device without departing from the scope of the present disclosure.

The user device 120, in one embodiment, includes a user interface application 122, which may be utilized by a user to conduct network based financial transactions (e.g., remote network based electronic commerce) with the one or more merchant devices 140, the one or more issuer devices 160, and/or the service provider 180 over the network 150. In various implementations, the user interface application 122 may be implemented as a network commerce application and/or a mobile commerce application to initiate, track, manage, and store data and information (e.g., card verification data and information) related to network based electronic commerce for viewing, searching, and/or purchasing items, products, and/or services over the network 150. In one aspect, the user device 120 may be linked to an account with the service provider 180 for direct and/or automatic settlement of purchase requests between a user and the one or more merchant devices 140 and/or the one or more issuer devices 160 via the user interface application 122.

In one embodiment, the user interface application 122 comprises a software program, such as a graphical user interface (GUI), executable by a processor that is configured to interface and communicate with the one or more merchant devices 140, the one or more issuer devices 160, and/or the service provider 180 via the network 150. In one implementation, the user interface application 122 comprises a browser module adapted to provide a network interface to browse information (e.g., card verification information) available over the network 150. For example, the user interface application 122 may be implemented, in part, as a web browser to view and search various types of information available over the network 150. In another example, the user is able to access merchant websites of the one or more merchant devices 140 over the network 150 to view, search, and select items, products, and/or services for purchase, and the user is able to purchase selected items, products, and/or services from the one or more merchant devices 140 via the service provider 180. In another example, the user is able to access issuer websites of the one or more issuer devices 160 over the network 150 to access and view user accounts including payment media accounts related to the user, and the user is able to update user accounts and open new accounts including payment media accounts. The user may conduct network based financial transactions with the one or more merchant devices 140 and the one or more issuer devices 160 via the service provider 180.

In one embodiment, upon user instruction, the user interface application 122 may be installed and/or run on the user device 120. The user may run the user interface application 122 on the user device 120 to access the service provider 180 via the network 150. In one aspect, upon installation and/or execution of the user interface application 122, the user may be prompted to establish a user account for login with the service provider 180, wherein the user may use the user interface application 122 and the user device 120 to access the service provider 180 via the network 150. When establishing a user account, the user may be asked to provide personal information, such as name, location information (e.g., address), phone number, etc., and financial information, such as banking information, credit card information, etc. In another aspect, referring to FIG. 1, information related to the user may be packaged as a user identifier 126, which is described in greater detail herein.

The user device 120, in various embodiments, may include other applications 124 as may be desired in one or more embodiments of the present disclosure to provide additional features available to the user. In various examples, such other applications 124 may include security applications for implementing user-side security features, programmatic client applications for interfacing with appropriate application programming interfaces (APIs) over the network 150, and/or various other types of generally known programs and/or software applications. In various other examples, other applications 124 may interface with the user interface application 122 for improved efficiency and convenience. In one example, files, data, and/or information may be imported from various types of accounting software (e.g., a spreadsheet application) directly into the user interface application 122 for improved tracking of payments and settlements related to purchases via the network 150. Accordingly, it should be appreciated that the user interface application 122 and each of the other applications 124 are adapted to make API calls over the network 150.

The user device 120, in various embodiments, may include the user identifier 126, which may be implemented as operating system registry entries, cookies associated with the user interface application 122, identifiers associated with hardware of the user device 120, and/or various other appropriate identifiers. The user identifier 126 may include one or more attributes related to the user, such as personal information related to the user (e.g., one or more user names, passwords, photograph images, biometric ids, addresses, phone numbers, etc.) and banking information (e.g., one or more banking institutions, credit card issuers, user account numbers, security data and information, etc.). In various aspects, the user identifier 126 may be passed with user transaction requests to the service provider 180 via the network 150, and the user identifier 126 may be utilized by the service provider 180 to associate the user with a particular user account maintained by the service provider 180.

The user device 120, in one embodiment, may include a network interface component (NIC) 128 adapted for communication with the network 150. In various implementations, the network interface component 128 may comprise a wireless communication component, such as a mobile cellular component, a wireless broadband component, a wireless satellite component, or various other types of wireless communication components including radio frequency (RF), microwave frequency (MWF), and/or infrared frequency (IRF) components adapted for communication with the network 150. In various other implementations, the network interface component 128 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 150.

The one or more merchant devices 140, in one embodiment, may be implemented using any appropriate combination of hardware and/or software configured for wired and/or wireless communication over the network 150. In various implementations, the merchant devices 140 may be implemented as a network server, a personal computer (PC), a personal digital assistant (PDA), a notebook computer, and/or various other generally known types of wired and/or wireless computing devices for communication with the network 150. In another implementation, the merchant device 140 may be implemented as a mobile device (e.g., a wireless cellular phone) adapted for communication with the network 150.

In another embodiment, the one or more merchant devices 140 may be maintained as one or more network servers by one or more business entities (e.g., merchant sites, resource information sites, utility sites, real estate management sites, social networking sites, etc.) offering various items, products, and/or services for purchase and payment, which may need registration of user identity information as part of offering the items, products, and/or services to one or more users over the network 150. Accordingly, each of the one or more merchant devices 140 may comprise at least one network based server in communication with the network 150 having a merchant interface application 142 and a products/services database 144 for presenting and identifying one or more available items, products, and/or services for purchase via the network 150, which may be made available to the user device 120 for viewing and purchase by the user. In one aspect, each of the network based merchant servers may be accessible via a mobile communication device (e.g., wireless cellular phone) for management purposes. For example, each merchant entity may remotely access and interact with their own network based merchant server via a mobile communication device for management purposes.

In one embodiment, each of the merchant devices 140 includes the merchant interface application 142, which may be utilized by the one or more merchant devices 140 to conduct network based financial transactions (e.g., remote network commerce, such as shopping, purchasing, bidding, etc.) with one or more users via one or more user devices 120 and/or the service provider 180 over the network 150. For example, the merchant interface application 142 may be implemented as an electronic commerce application to initiate, track, manage, and store data and information (e.g., card verification data and information) related to remote network based commerce for the viewing, searching, and purchasing of items, products, and/or services over the network 150. In one aspect, each merchant device 140 may be linked to an account with the service provider 180 for direct and/or automatic settlement of purchase requests between each merchant 140 and one or more users via the merchant interface application 142.

In one implementation, the merchant interface application 142 comprises a software program, such as a GUI, executable by a processor configured to interface and communicate with one or more users via one or more user devices 120 and/or the service provider 180 via the network 150. In another implementation, merchant interface application 142 comprises a network interface module that makes information available to the user device 120 over the network 150. For example, the merchant interface application 142 may be implemented, in part, as a website manager to provide, list, and present information to the user device 120 via the network 150. In another example, each merchant 140 is capable of providing one or more network based merchant websites to allow viewing, searching, and selecting of items, products, and/or services for purchase by the user via the user device 120, and the user is able to purchase items, products, and/or services from the one or more merchant devices 140 via the merchant websites and the service provider 180. As such, each of the merchant devices 140 may conduct financial transactions with the user via the merchant interface application 142 and the service provider 180.

In various implementations, the merchant interface application 142 may include a marketplace application, which may be configured to provide transaction information related to the products and/or services database 144 to the user interface application 122 of the user device 120 via the network 150. In one aspect, the transaction information may include card verification information. For example, the user may interact with the merchant 140 via the marketplace application through the user interface application 122 over the network 150 to search and view various items, products, and/or services available for purchase from the products/services database 144. In one implementation, the marketplace application may include a checkout module adapted to facilitate online financial transactions with the user 120, and the checkout module may be adapted to accept payment from the user 120 and process the payment via interaction with the service provider 180.

In one implementation, upon merchant instruction, the merchant interface application 142 may be installed and/or run on each merchant device 140. Each merchant may run the merchant interface application 142 on their merchant device 140 to access service provider 180 via the network 150. In one aspect, upon installation and/or execution of the merchant interface application 142, each merchant may be prompted to establish a merchant account for login with the service provider 180, wherein each merchant may use merchant interface application 142 and merchant device 140 to access the service provider 180 via the network 150. In one aspect, when establishing a merchant account, each merchant may be asked to provide business information, such as business name, location information (e.g., address), phone number, etc., and financial information, such as banking information, credit card information, taxing entity, etc. In another aspect, information related to the merchant may be packaged as a merchant identifier 146, which is described in greater detail herein.

In various implementations, the merchant interface application 142 may include one or more other applications as may be desired to provide additional features available to the merchant. In various examples, such other applications may include security applications for implementing user-side security features, programmatic applications for interfacing with appropriate application programming interfaces (APIs) over the network 150, and/or various other types of generally known programs and/or software applications. In various other examples, files, data, and/or information may be imported from various types of accounting software (e.g., a spreadsheet application) directly into the merchant interface application 142 for improved tracking of payments and settlements related to electronic commerce via the network 150. As such, it should be appreciated that merchant interface application 142 and any other application may be adapted to make API calls over the network 150.

Each of the merchant devices 140, in various embodiments, may include at least one merchant identifier 146, which may be included as part of the one or more items, products, and/or services made available for purchase so that, e.g., particular items, products, and/or services are associated with particular merchant devices 140. In one implementation, the merchant identifier 146 may include one or more attributes and/or parameters related to the merchant, such as business and/or banking information. For example, the merchant identifier 146 may be passed from each particular merchant 140 to the service provider 180 when the user selects an item, product, and/or service for holding, monitoring, and/or purchasing from each particular merchant 140. In one aspect, the merchant identifier 146 may be used by the service provider 180 to associate particular items, products, and/or services selected for purchase with a particular merchant account maintained by the service provider 180. In another aspect, the user may conduct financial transactions (e.g., selection, monitoring, purchasing, and/or providing payment for items, products, and/or services) with each merchant server 140 via the service provider 180 over the network 150.

In various embodiments, each of the one or more business entities having a related merchant server 140 may need to establish at least one merchant account with the service provider 180. When establishing a merchant account, each of the one or more business entities may need to provide business information, such as owner name, owner address, social security number, date of birth, phone number, email address, etc., and financial information, such as banking information, merchant account information, credit card information, payment processing information, etc.

In one embodiment, each merchant device 140 includes at least one network interface component (NIC) 148 adapted for communication with the network 150. For example, in various implementations, the network interface component 148 may comprise a wireless communication component, such as a mobile cellular component, a wireless broadband component, a wireless satellite component, or various other types of wireless communication components including radio frequency (RF), microwave frequency (MWF), and/or infrared frequency (IRF) components adapted for communication with the network 150. In various other implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 150.

The one or more issuer devices 160, in one embodiment, may be implemented using any appropriate combination of hardware and/or software configured for wired and/or wireless communication over the network 150. In various implementations, the issuer devices 160 may be implemented as a network server, a personal computer (PC), a personal digital assistant (PDA), a notebook computer, and/or various other generally known types of wired and/or wireless computing devices for communication with the network 150. In another implementation, the issuer devices 160 may be implemented as a mobile device (e.g., a wireless cellular phone) adapted for communication with the network 150.

In another embodiment, the one or more issuer devices 160 may be maintained as one or more network servers by one or more financial entities (e.g., banking institutions, credit institutions, etc. authorized to conduct bank related transactions) adapted to establish and maintain accounts and issue payment media, which may need registration of user identity information as part of establishing and maintaining accounts and issuing payment media to one or more users over the network 150. Accordingly, each of the one or more issuer devices 160 may comprise at least one network based server in communication with the network 150 having an issuer interface application 162 and an account database 164 for maintaining one or more user accounts over the network 150, which may be made available to the user device 120 for viewing, updating, and maintaining by the user. In one aspect, each of the network based issuer servers may be accessible via a mobile communication device (e.g., wireless cellular phone) for management purposes. For example, each issuer entity may remotely access and interact with their own network based issuer server via a mobile communication device for management purposes.

The issuer device 160, in one embodiment, may be configured to maintain one or more user accounts including payment media accounts in the account database 164, each of which may include account information 170 and/or payment media information 172 associated with one or more individual users. In various examples, account information 170 may include card verification data and information related to one or more users. In another example, account information 170 may include private financial data and information of the user, such as one or more locations, addresses, account numbers, passwords, debit and/or credit card information, banking information, or other types of financial information. In various implementations, the methods and systems described herein may be modified to accommodate additional users that may or may not be associated with a user account.

In one embodiment, each of the issuer devices 160 includes the issuer interface application 162, which may be utilized by the one or more issuer devices 160 to conduct network based transactions (e.g., card verification transactions) with one or more users via one or more user devices 120 and/or the service provider 180 over the network 150. For example, the issuer interface application 162 may be implemented as an electronic verification application to manage, track, and store data and information (e.g., card verification data and information) related to remote network based payment media verification over the network 150. In one aspect, each issuer device 160 may be accessed by the service provider 180 for direct and/or automatic authorization of payment media on behalf of a user request via the user device 120, which is further described herein.

In one implementation, the issuer interface application 162 comprises a software program, such as a GUI, executable by a processor configured to interface and communicate with one or more users via one or more user devices 120 and/or the service provider 180 via the network 150. In another implementation, issuer interface application 162 comprises a network interface module that makes information available to the user device 120 over the network 150. For example, the issuer interface application 142 may be implemented, in part, as an account manager to present information to the user device 120 via the network 150. In another example, the issuer interface application 142 may be implemented, in part, as a payment media verifier to verify that a user is the owner of the payment media via the network 150. As such, each of the issuer devices 160 may conduct verification transactions with the user via the service provider 180, as further described herein.

In one implementation, upon issuer instruction, the issuer interface application 162 may be installed and/or run on each issuer device 160. Each issuer may run the issuer interface application 162 on their issuer device 160 to access service provider 180 via the network 150. In one aspect, information related to the issuer may be packaged as an issuer identifier 166, which is further described herein.

In various implementations, the issuer interface application 162 may include one or more other applications as may be desired to provide additional features available to the issuer. In various examples, such other applications may include security applications for implementing user-side security features, programmatic applications for interfacing with appropriate application programming interfaces (APIs) over the network 150, and/or various other types of generally known programs and/or software applications. In various other examples, files, data, and/or information may be imported from various types of accounting software (e.g., a spreadsheet application) directly into the issuer interface application 162 for improved tracking of accounts and payment media related to electronic financial transactions via the network 150. As such, it should be appreciated that issuer interface application 162 and any other application may be adapted to make API calls over the network 150.

Each of the issuer devices 160, in various embodiments, may include at least one issuer identifier 166, which may be included as part of access to verification services made available to users and the service provider 180. In one implementation, the issuer identifier 166 may include one or more attributes and/or parameters related to the issuer, such as identity and/or banking information. For example, the issuer identifier 166 may be passed from each issuer 160 to the service provider 180 when the user requests verification of payment media. In one aspect, the issuer identifier 166 may be used by the service provider 180 to associate particular users with a particular user account maintained by the service provider 180. In another aspect, the user may conduct verification transactions (e.g., account and payment media verification) with each issuer server 160 via the service provider 180 over the network 150, as further described herein.

In various embodiments, each of the one or more financial entities having a related issuer server 160 may need to establish their identity with the service provider 180. When establishing an issuer identity, each of the one or more financial entities may need to provide information, such as entity name, entity address, routing numbers, etc.

In one embodiment, each issuer device 160 includes at least one network interface component (NIC) 168 adapted for communication with the network 150. For example, in various implementations, the network interface component 168 may comprise a wireless communication component, such as a mobile cellular component, a wireless broadband component, a wireless satellite component, or various other types of wireless communication components including radio frequency (RF), microwave frequency (MWF), and/or infrared frequency (IRF) components adapted for communication with the network 150. In various other implementations, the network interface component 168 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 150.

The service provider 180, in one embodiment, may be maintained by a network based transaction processing entity, which may provide processing for network based transactions including online information and/or financial transactions on behalf of the user via the user device 120 and/or each merchant device 140. As shown in FIG. 1, the service provider 180 includes a service interface application 182, which may be adapted to interact with the user device 120 and/or each merchant 140 over the network 150 to facilitate electronic commerce including processing card verification data and information. In various examples, financial transactions may include the selection, purchase, and/or payment of items, products, and/or services by a user via the user device 120 from one or more merchant devices 140. In some examples, purchase and payment for selected items, products, and/or services may include one or more tax assessments. In one embodiment, the service provider 180 may be provided by a network based transaction processing entity, such as PayPal, Inc. and/or eBay of San Jose, Calif., USA.

The service interface application 182, in one embodiment, is adapted to utilize a processing module 184 to process purchases and/or payments, including card verification, for financial transactions between the user device 120 and each of the merchant devices 140. In one implementation, the processing module 184 is adapted to resolve financial transactions through validation, delivery, and settlement. For example, the processing module 184 may be adapted to communicate with a clearing house, such as automated clearing house (ACH), to debit a user account related to the user according to an amount specific in a payment and credit therewith a merchant account related to a merchant. In another implementation, the processing module 184 is adapted to assess and disperse taxes for financial transactions through validation, delivery, and settlement. For example, tax assessment may include automatically calculating tax on Internet purchases based on buyer location, seller location, and/or type of items, products, and/or services purchased. Accordingly, the service interface application 182 in conjunction with the processing module 184 is adapted to settle indebtedness on behalf of a user between the user device 120 and each of the merchant devices 140, wherein accounts may be directly and/or automatically debited and/or credited, respectively, of monetary funds in a manner as accepted by the banking industry.

The service interface application 182, in one embodiment, is adapted to utilize a card verification module 186 adapted to verify payment media (e.g., debit card and/or credit card) on behalf of a user for network based financial transactions. In one implementation, the card verification module 186 is adapted to enhance user experience by enabling service users to instantly lift or raise account limits for financial transactions over a network, such as the Internet. In one aspect, the card verification module 186 is adapted to provide instant verification of payment media (e.g., debit card and/or credit card) presented to the service provider 180 by a user of the user device 120 over the network 150. In another aspect, a user or a merchant may communicate with the service provider 180 for utilization of the card verification module 186 as part of a checkout procedure or during choice of payment.

In one implementation, the card verification module 186 is adapted to verify that payment media (e.g., debit card and/or credit card) requested to be added to a user account belongs to the owner of the user account. The card verification module 186 may be adapted to verify a user account and/or lift account limits for the user account. The card verification module 186 may be utilized by the service provider 180 when a risk policy determines that the payment media needs to be verified (e.g., verified that the user is the owner of the card) before being utilized in financial transactions involving the service provider 180. In some instances, the card verification module 186 may be utilized to lift or raise account limits (e.g., spending limits for a user purchase account) and enable a service user to have higher sending, receiving, and/or withdrawal capabilities. The card verification module 186 may be utilized as a real-time process involving instant card verification, which may result in higher completion rates for purchases, improved user comprehension, reduced volume of customer service calls, and increased transactions over the network. In one aspect, a real-time, instant card verification process may improve user experiences for network based transactions when interacting with the service provider 180.

In accordance with one embodiment of the present disclosure, the card verification module 186 may be adapted to enable instant card verification using a secure protocol (e.g., 3DSecure protocol), which utilizes secure authentication to instantly verify a user's card (e.g., debit card and/or credit card). The card verification module 186 may be adapted to complete the card verification process in a short interval (e.g., in minutes). In one aspect, the card verification process enhances user experience by enabling service users to instantly lift or raise account limits for financial transactions over the network 150.

In one embodiment, the secure protocol utilizes 3DSecure protocol, which comprises an online authentication protocol that is used in network transactions. 3DSecure is an XML-based network protocol utilized as an additional layer of security for online debit and/or credit card transactions. 3DSecure was developed to improve security of Internet payments, and 3DSecure is an authentication protocol for online payments. Utilization of 3DSecure authentication protocol may reduce fraud. Generally, 3DSecure protocol links financial authorization to online authentication based on a three domain model including Acquirer Domain (i.e., merchant and bank to which funds are paid), Issuer Domain (i.e., card issuing bank), and Interoperability Domain (i.e., infrastructure to support 3DSecure protocol). In various implementations, 3DSecure protocol utilizes XML messages sent over SSL connections with client authentication, and transactions utilizing 3DSecure initiate a redirect to a website of the card issuing bank to authorize the financial transaction. 3DSecure protocol utilizes a password-based method for authentication to link a secret password to the card. 3Dsecure may generally provide cardholders with a decreased risk of fraudulent use of their payment cards by other users on the Internet.

In various implementations, the issuing entity of the payment media prompts the user for a secure password (e.g., a 3Dsecure password) that is known only to the issuing entity and the user. In one aspect, a third-party authentication vendor authorized by the issuing entity may know the secure password. In another aspect, since the service provider 180 does not know the secure password and is not responsible for capturing the secure password, the secure password may be used by the issuing entity and/or the third-party authentication vendor as evidence that the user is the owner of the payment media. Since service provider 180 does not capture the secure password, there is a reduced security risk for fraud.

The service interface application 182, in one embodiment, may be adapted to utilize a notification module, which is adapted to notify users of verified and/or non-verified payment media, such as debit cards and/or credit cards, for network based financial transactions. In one aspect, the service interface application 182 in combination with the notification module may be adapted to notify or alert the user of approval to use particular debit cards and/or credit cards for network based financial transactions with notifications or alerts (e.g., email message, text message, instant message, voice message, etc.) provided over the network 150. In another implementation, the user may review approval of particular debit cards and/or credit cards for network based financial transactions via the notifications or alerts.

The service application 182, in one embodiment, may be adapted to utilize a selection processing module to process and monitor user selection events during online shopping by the user via the user device 120. In one aspect, the selection processing module allows the service provider 180 to process and monitor user selections during online navigation and shopping events over the network 150. For example, the service provider 180 interfaces with the user device 120 via, e.g., a browser window to monitor the user and the user device 120 during navigation and shopping events on various merchant sites. The selection processing module may be used by the service provider 180 to monitor user selections of one or more items, products, and/or services. In another example, the selection processing module may be used by the service provider 180 to provide the user with estimated tax amounts for items, products, and/or services held in an online shopping cart.

The service provider 180, in one embodiment, may be configured to maintain one or more user accounts and merchant accounts in an account database 190, each of which may include account information 192 associated with one or more individual users and the one or more merchant devices 140. In various examples, account information 192 may include card verification data and information related to one or more users and/or merchants. In various other examples, account information 192 may include inventory information, such as types of items, products, and/or services proffered for sale by the user and/or merchants. As such, it should be appreciated that the user may be considered a buyer or seller and proffer items, products, and/or services for sale over the network 150, without departing from the scope of the present disclosure. It should also be appreciated that the merchant may be considered a buyer or seller and proffer items, products, and/or services for sale over the network 150, without departing from the scope of the present disclosure.

In another example, account information 192 may include private financial data and information of the user and/or each merchant 140, such as one or more locations, addresses, account numbers, passwords, credit card information, banking information, or other types of financial information, which may be used to facilitate online financial transactions between the user and the one or more merchant devices 140. In various implementations, the methods and systems described herein may be modified to accommodate additional users and/or additional merchants that may or may not be associated with at least one existing user account and/or merchant account, respectively.

In one implementation, the user and/or user device 120 may have identity attributes stored with the service provider 180 as the user identifier 126, and the user and/or user device 120 may have credentials to authenticate or verify identity with the service provider 180. In one aspect, user attributes may include personal information and banking information, as previously described, including location, tax rates, etc. In other aspects, the user attributes may be passed to the service provider 180 as part of a login and/or transaction request, and the user attributes may be utilized by the service provider 180 to associate the user and/or the user device 120 with one or more particular user accounts in the account database 190 maintained by the service provider 180.

In another implementation, each of the merchants and/or merchant devices 140 may have identity attributes stored with the service provider 180 as merchant identifiers 146, and each of the merchant devices 140 may have credentials to authenticate or verify identity with the service provider 180. In one aspect, merchant attributes may include personal, business, and banking information, as previously described, including location, tax rates, etc. In other aspects, the merchant attributes may be passed to the service provider 180 as part of a login and/or transaction request, and the merchant attributes may be utilized by the service provider 180 to associate each of the merchant devices 140 with one or more merchant accounts in the account database 190 maintained by the service provider 180.

The service provider 180, in various embodiments, may include a network interface component (NIC) 194 adapted for communication with the network 150 and any network based communication devices including the network interface component 128 of the user device 120 and the network interface component 148 of each merchant 140. In various implementations, the network interface component 194 of the service provider 180 may include a wireless communication component, such as a wireless broadband component, a wireless satellite component, or various other types of wireless communication components including radio frequency (RF), microwave frequency (MWF), and/or infrared frequency (IRF) components adapted for communication with the network 150. In other various implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 150.

The service provider 180, in one embodiment, may include one or more databases 196 (e.g., internal and/or external databases) for storing and tracking information related to financial transactions, including card verification data and information, between one or more users, merchant devices 140, and service provider 180. In one implementation, the databases 196 may provide a historical survey of financial transactions between the user device 120, the one or more merchant devices 140, and the service provider 180. For example, the service interface application 182 may be adapted to monitor, track, log, and store transaction information, including card verification data and information, related to network based electronic commerce between the user device 120, each merchant 140, and/or the service provider 180, and the stored transaction information is accessible from the databases 196 for assessment, analysis, maintenance, and settlement.

Figure 2:
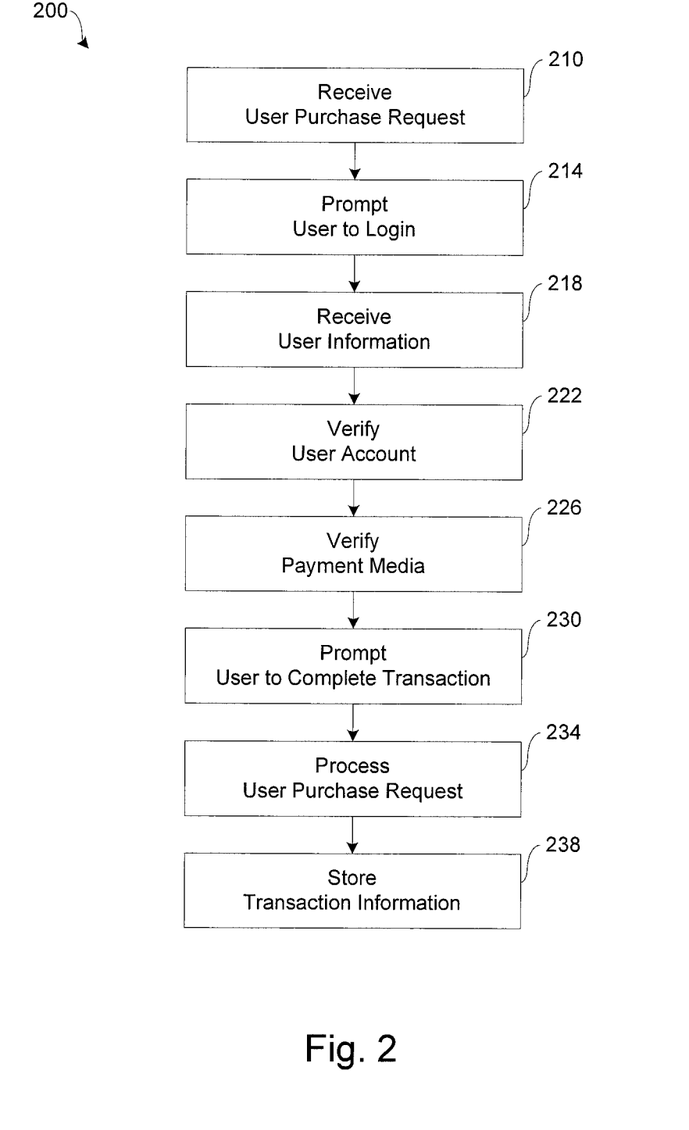
FIGS. 2-4 show various methods to facilitate electronic commerce including card verification over a network, in accordance with embodiments of the present disclosure.

FIG. 2 shows one embodiment of a method 200 for facilitating electronic commerce including card verification over a network 150. It should be appreciated that, for purposes of explanation, the method 200 of FIG. 2 is described in reference to the system 100 of FIG. 1, but should not be limited thereto.

Referring to FIG. 2, the service provider 180 is adapted to receive a purchase request from a user via the user device 120 over the network 150 (block 210). For example, a user or buyer may visit an online merchant or seller website and navigate through the merchant's or seller's products and pages to select one or more items for purchase. The selected items are placed in a virtual shopping cart until checkout. When the user is done shopping, the user accesses a merchant webpage for viewing the selected items in the virtual shopping cart. At this merchant page, the user may decide to checkout (i.e., purchase) and select a link to the service provider 180 to request processing of the purchase transaction. Upon user selection, the service provider 180 receives a purchase request in reference to the shopping cart and the one or more items selected for purchase. In one implementation, the user purchase request includes information related to the transaction including user information (e.g., user name, user account, user location, payment media information, etc.) and merchant information (e.g., merchant name, merchant account, merchant location, and one or more items selected for purchase including item description, category, price, weight, size, etc.).

The service provider 180 is adapted to prompt the user to login from the user device 120 over the network 150 (block 214). In one aspect, the user is logging-in to the service provider 180 with an intention to checkout and provide payment for items selected for purchase from the merchant as provided in the purchase request.

The service provider 180 is adapted to receive user information, such as identity data and information, from the user via the user device 120 over the network 150 (block 218). In one implementation, user identity information may include attributes related to the user, such as personal information related to the user (e.g., usernames, passwords, account numbers, payment media information, photograph images, biometric ids, addresses including location information, phone numbers, etc.) and banking information (e.g., banking institutions, debit card issuers, credit card issuers, user account numbers, payment media information, security information, etc.). In one aspect, the user identity information may be utilized by the service provider 180 to verify the identity of the user along with verifying payment media, such as debit cards and/or credit cards.

The service provider 180 is adapted to verify a user account related to the user in the account database 190 based on user information passed from the user device 120 over the network 150 (block 222). In one implementation, the service provider device 180 processes a user login request by attempting to locate and access an account related to the user in the account database 190. If the user is determined to be an existing user by the service provider 180, then the service provider 180 is adapted to verify the user account and user identity information provider by user 102 in the user login request by comparing the received user information with account information 192 stored as part of the user account in the account database 190. In one aspect, the service provider 180 may determine if the user account is current and active. In some instances, user account information may need to be updated, and as such, the service provider device 180 may prompt the user 102 to update user account information 188, including payment media information (e.g., debit card and/or credit card numbers, expiration dates, etc.), in the user account for the user. The updated information may include other payment media information, including a change of address.

It should be appreciated by those skilled in the art that the service provider 180 may cancel the user login request at any time during the process of method 200 if, for example, it is determined by the service provider 180 that the user enters wrong information or the user is trying to access an account with criminal intent.

The service provider 180 is adapted to verify payment media (e.g., a debit card and/or credit card) related to the user account in the account database 190 based on user information passed from the user device 120 over the network 150 (block 226). In one implementation, verifying payment media may include accepting payment media from the user (e.g., at least one account number for a debit card and/or credit card related to the user or owned by the user) based on user information passed from the user device 120 over the network 150. In another implementation, verifying payment media may include linking payment media to the user account based on user information passed from the user device 120 over the network 150. In another implementation, verifying payment media may include using payment media already approved for use by the service provider 180 as stored with the user account. In another implementation, verifying payment media may include receiving a request from the user to add additional payment media to the user account. The service provider 180 is adapted to process the verification of payment media on behalf of the user.

The service provider 180 is adapted to prompt the user to complete the requested transaction from the user device 120 over the network 150 (block 230). For example, in one implementation, the service provider 180 may prompt the user via the user device 120 to select a permission button to settle the debt with funds in the user account, which may be transferred from the user account to an account related to the merchant for purchases.

The service provider 180 is adapted to process the purchase request from the user via the user device 120 over the network 150 (block 234). In one implementation, the service provider 180 is adapted to utilize user information and merchant information to process and resolve the transaction through validation, delivery, and settlement.

The service provider 180 is adapted to store transaction information related to the processed transaction (block 238). In one implementation, user information (e.g., attributes related to the user including user name, user account number, user location, payment media information, etc.), merchant information (e.g., merchant name, merchant account, merchant location, and one or more items selected for purchase), and other transaction information related to the processed transaction may be stored as part of the user account in the account database 190. In another implementation, the service provider 180 may utilize one or more other databases (e.g., internal and/or external databases 196) for storing data and information related to financial transactions. Databases utilized by the service provider 180 may provide a historical survey of financial transactions between the user device 120, the one or more merchant devices 140, and the service provider 180. The service provider 180 may be adapted to monitor, track, log, and store transaction information, including payment media information, related to network based electronic commerce between the user device 120, each merchant 140, and/or the service provider 180. The stored transaction information is accessible from the databases 196 for assessment, analysis, maintenance, and settlement.

Figure 3:
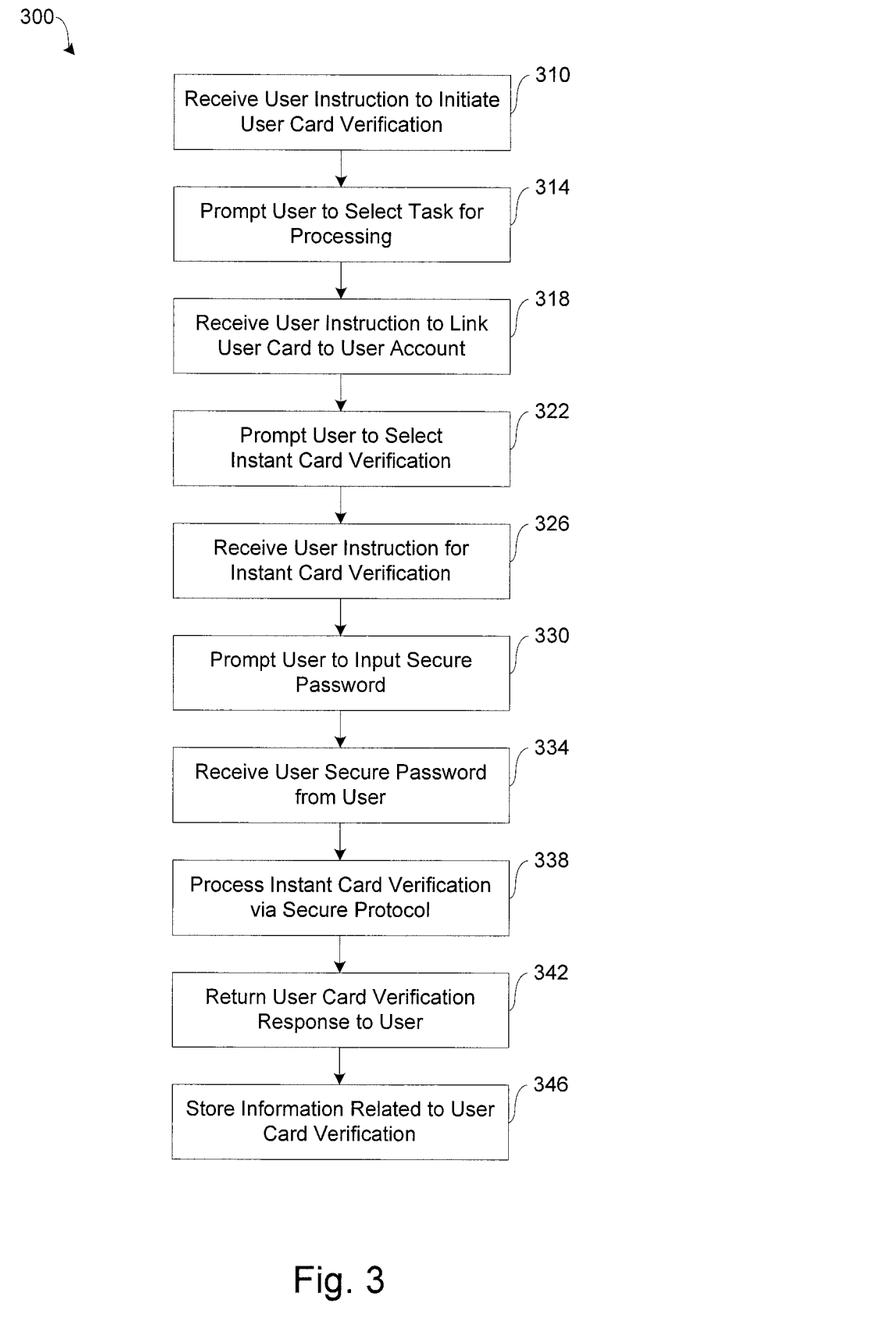

FIG. 3 shows one embodiment of a method 300 for facilitating electronic commerce including card verification over a network, such as network 150. It should be appreciated that, for purposes of explanation, the method 300 of FIG. 3 is described in reference to the system 100 of FIG. 1 and method 200 of FIG. 2, but should not be limited thereto.

Referring to FIG. 3, the service provider 180 is adapted to receive user instruction over the network 150 to initiate user card verification (block 310). In one aspect, the user starts or initiates the card verification process. The service provider 180 is adapted to prompt the user over the network 150 to select a task for processing over the network 150 (block 314). In one aspect, the service provider 180 gives the user a choice to perform instant card verification. The service provider 180 is adapted to receive user instruction over the network 150 to link a user card to a user account related to the user (block 318). In one aspect, the user requests that a card (e.g., a debit card and/or credit card) be added or linked to a user account related to the user.

In one implementation, the user may utilize the user device 120 to login to the service provider 180 over the network 150, access a user account related to the user in the account database 190, and request the addition of a card (e.g., a debit card and/or credit card) to be linked to the user account. In one instance, the user may desire to link the card to the user account to lift or raise account limits (e.g., spending limits for a user purchase account). In other instances, the user may desire to link the card to the user account to enable increased sending, receiving, and/or withdrawal capabilities.

The service provider 180 is adapted to prompt the user over the network 150 to select instant card verification (block 322). In one implementation, the service provider 180 is adapted to provide instant verification of the card presented by the user of the user device 120 over the network 150. In one aspect, the service provider 180 is adapted to utilize the card verification module 186 as a real-time process involving instant card verification.

The service provider 180 is adapted to receive user instruction over the network 150 for selection of instant card verification (block 326). The service provider 180 is adapted to prompt the user over the network 150 to input a secure password (block 330). In one implementation, the secure password utilizes a 3DSecure password. Accordingly, in one aspect, if the user is an enrolled 3DSecure user, then the user may enter a 3DSecure password for processing. The service provider 180 is adapted to receive the secure password (e.g., 3DSecure) from the user over the network 150 (block 334).

In one implementation, the service provider 180 may be adapted to utilize the card verification module 186 to enable instant card verification via a secure protocol. In one example, the secure protocol utilizes 3DSecure protocol, which is an online authentication protocol that is used in network transactions. Accordingly, the secure protocol is adapted to utilize 3DSecure authentication to instantly verify the validity and/or authenticity of the user's card (e.g., debit card and/or credit card). One advantage is that the card verification module 186 may process card verification in a short interval (e.g., in minutes), which may be referred to as instant card verification. In one aspect, the service provider 180 may verify that the user requesting card verification is the actual owner of the card. In another aspect, the service provider 180 may verify that the card requested by the user to be added to the user account belongs to the owner of the user account.

In one implementation, the issuer 160 of the payment media prompts the user for a secure password (e.g., a 3Dsecure password) that is known only to the issuer 160 and the user. In one aspect, a third-party authentication vendor authorized by the issuer 160 may know the secure password. In another aspect, the service provider 180 does not know the secure password and does not capture the secure password. As such, the secure password may be used by the issuer 160 and/or the third-party authentication vendor to verify that the user is the owner of the payment media.

The service provider 180 is adapted to process instant card verification on behalf of the user via the secure protocol (block 338). In one aspect, the user's card may be verified instantly, such as within seconds or minutes, via the secure protocol (e.g., the secure protocol is adapted to utilize 3DSecure protocol). The service provider 180 is adapted to return a response to the user related to verification of the user card (block 342). In one aspect, the response to the user card verification may be displayed to the user on the user device 120. In another aspect, displaying the user card verification response may include notifying the user of the response via the user device 120, which may include one or more of, e.g., email, text messaging, instant messaging, and/or voice messaging.

In one implementation, for secure authentication utilizing 3DSecure authentication, the service provider 180 is adapted to call a LookUp API that handshakes with a third-party authentication vendor for 3DSecure (e.g., Cardinal) and provides a response if the user's card is enrolled or not and whether the card issuer supports 3DSecure or not. If the response is no, the service provider 180 terminates the process. If the response is yes, then the service provider 180 is adapted to receive a URL of the issuing bank along with the yes confirmation, and the service provider 180 provides the URL of the issuing bank to the user via the user device 120. The user may then authenticate the card issuing bank based on whatever is the available authentication for that region/issuer. The service provider 180 is adapted to call a Validate API that handshakes with the third-party authentication vendor for 3DSecure (e.g., Cardinal) and provides a response as to whether the user has been authenticated or not. The result from the Validate API call is utilized to validate and confirm the user's card for future transactions.

The service provider 180, in one embodiment, may be adapted to store information related to user card verification (block 346). In various implementations, user information (e.g., attributes related to a user including user name, user account number, user passwords, user location, number of linked debit and/or credit cards, debit card types, credit card types, user banking institution and affiliation, etc.), merchant information (e.g., merchant name, merchant account number, merchant passwords, merchant location, number of linked debit and/or credit cards, debit card types, credit card types, merchant banking institution and affiliation, one or more items selected for purchase, etc.), tax entity information (e.g., country, federal, state county, city, etc.), and other transaction information related to the processed transaction may be stored as part of a user account and/or merchant account in the account database 190 of the service provider 180.

In other implementations, the service provider 180 may utilize one or more databases (e.g., internal and/or external databases 196) for storing data and information, including card verification information, related to financial transactions. Databases utilized by the service provider 180 may store and provide access to historical surveys of one or more financial transactions between the user device 120, the one or more merchant devices 140, and the service provider 180. The service provider 180 may be adapted to monitor, track, log, display, and/or store transaction information, such as card verification data and information, related to network based electronic commerce between the user device 120, each merchant 140, and/or the service provider 180, and the stored transaction information is adapted to be accessible over the network 150 by the service provider 180 from the databases 196 for assessment, analysis, maintenance, and settlement.

Figure 4:
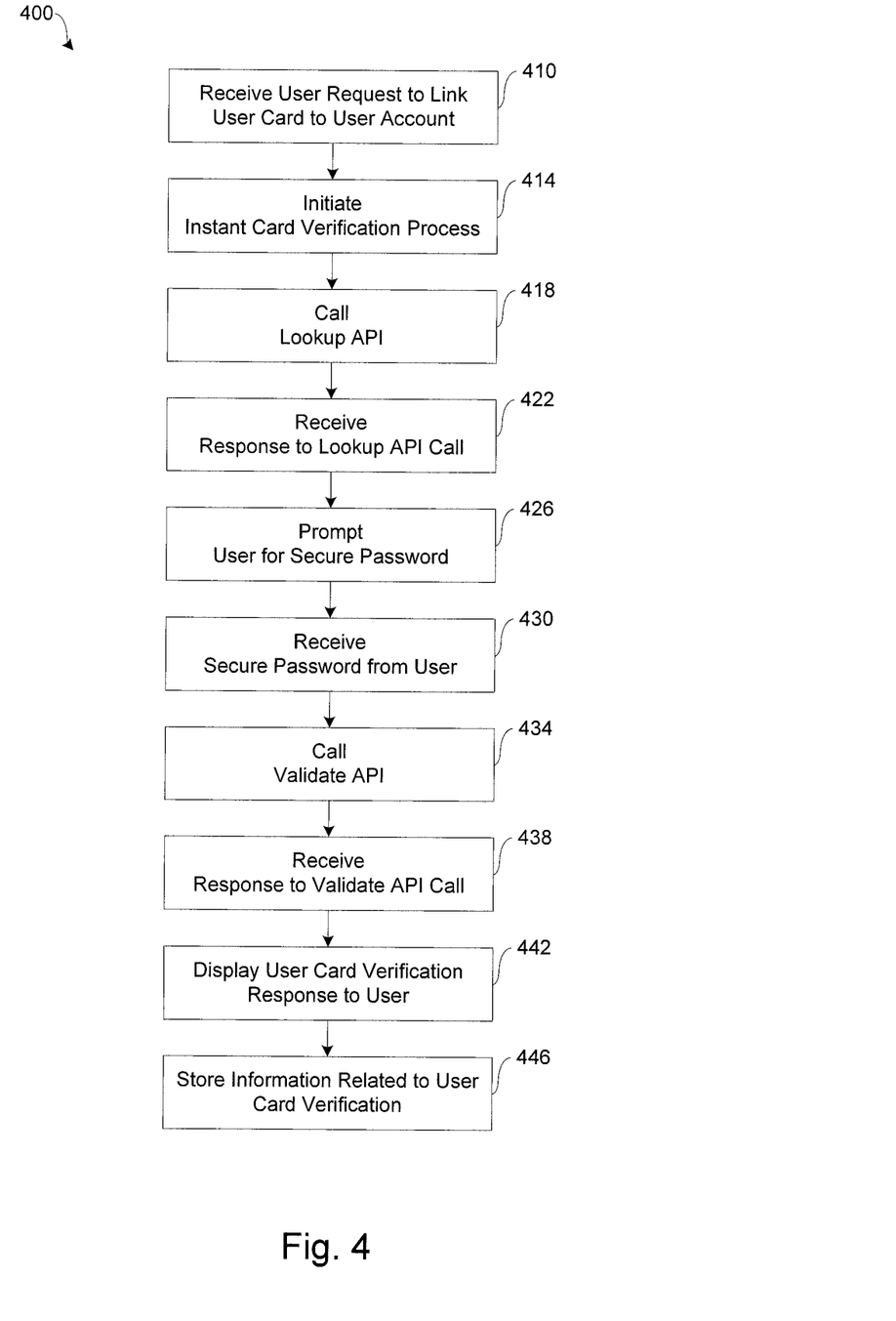

FIG. 4 shows one embodiment of a method 400 for facilitating electronic commerce including card verification over a network, such as network 150. It should be appreciated that, for purposes of explanation, the method 400 of FIG. 4 is described in reference to the system 100 of FIG. 1 and methods 200, 300 of FIGS. 2, 3, but should not be limited thereto.

Referring to FIG. 4, the service provider 180 is adapted to receive a user request over the network 150 to link a user card to a user account (block 410). In one aspect, the user request may be utilized to verify that the user card is linked to the user account and/or to verify that the user is the owner of the user card and/or user account.

In one implementation, the user may utilize the user device 120 to login to the service provider 180 over the network 150, access a user account related to the user in the account database 190, and request to link a card (e.g., a debit card and/or credit card) to the user account. In one instance, the user may desire to link the card to the user account to lift or raise account limits (e.g., spending limits for a user purchase account). In other instances, the user may desire to link the card to the user account to enable increased sending, receiving, and/or withdrawal capabilities.

The service provider 180 is adapted to initiate a process for instant card verification based on information in the user request (block 414). In one aspect, the service provider 180 is adapted to provide instant verification of the card presented by the user of the user device 120 over the network 150. The service provider 180 may utilize the card verification module 186 as a real-time process involving instant card verification using a secure verification resource, such as, for example, 3DSecure protocol.

The service provider 180 is adapted to call Lookup API (block 418). In one aspect, the service provider 180 is adapted to send a request to an external service provider (e.g., a third-party vendor or service provider that is adapted to communicate with the card issuing bank) to verify that the user and/or user's card number is enrolled in 3DSecure. As such, the service provider 180 is adapted to send user information (e.g., user name, user card number, etc.) to the external service provider to lookup the user name and/or user card number to verify that the user name and/or user card number is enrolled in 3DSecure.

The service provider 180 is adapted to receive a response to the Lookup API call (block 422). In one aspect, the service provider 180 is adapted to receive a response from the external service provider as to whether or not the user name and/or user card number are enrolled in 3DSecure. If the user name and/or user card number are not enrolled in 3DSecure, then the method 400 is terminated, and the card is not verified. Otherwise, if the user name and/or user card number are enrolled in 3DSecure, then the service provider 180 is adapted to prompt the user over the network 150 to input a secure password, such as a 3DSecure password (block 426). In one aspect, the service provider 180 interfaces with the user over the network 150 via the user device 120 and the user interface application 122 to prompt the user for the secure password, such as the 3DSecure password, in reference to the user provided card number. Once prompted, the user inputs the secure password to the user device 120 and sends the inputted secure password to the service provider 180 via the network 150. The service provider 180 is adapted to receive the user secure password, such as the 3DSecure password, from the user over the network 150 (block 430).

In one implementation, the issuer 160 of the payment media prompts the user for a secure password (e.g., a 3Dsecure password) that is known only to the issuer 160 and the user. In one aspect, a third-party authentication vendor authorized by the issuer 160 may know the secure password. In another aspect, the service provider 180 does not know the secure password and does not capture the secure password. As such, the secure password may be used by the issuer 160 and/or the third-party authentication vendor to verify that the user is the owner of the payment media.

In one implementation, the service provider 180 may utilize the card verification module 186 to enable instant card verification via a secure protocol, such as 3DSecure protocol, which uses 3DSecure authentication to instantly verify the validity and/or authenticity of the user's card (e.g., debit card and/or credit card). The card verification module 186 may process card verification in a short interval (e.g., in minutes), which may be referred to as instant card verification. The service provider 180 may verify that the user requesting card verification is the actual owner of the card. The service provider 180 may verify that the card requested by the user to be added to the user account belongs to the owner of the user account.

The service provider 180 is adapted to call Validate API (block 434). In one aspect, once the secure password, such as the 3DSecure password, is received from the user via the network 150, the service provider 180 is adapted to send a request to the external service provider to verify that the user provided 3DSecure password is valid for the user name and/or user card number as earlier provided by the user. As such, the service provider 180 is adapted to send user information related to the user provided 3DSecure password to the external service provider to validate and confirm that the user provided 3DSecure password is linked to the user name and/or user card number as enrolled in 3DSecure.

The service provider 180 is adapted to receive a response to the Validate API call (block 438). In one aspect, the service provider 180 is adapted to receive a response from the external service provider as to whether or not the user provided 3DSecure password is valid and corresponds to the user name and/or user card number as enrolled in 3DSecure. If the user provided 3DSecure password is not valid and does not correspond to the user name and/or user card number as enrolled in 3DSecure, then the method 400 is terminated, and the card is not verified. Otherwise, if the user provided 3DSecure password is valid and does correspond to the user name and/or user card number as enrolled in 3DSecure, then the service provider 180 is adapted to display a user card verification response to the user over the network 150 (block 442). In one implementation, displaying the user card verification response may include notifying the user of the response via the user device 120, which may include one or more of, e.g., email, text messaging, instant messaging, and/or voice messaging. In another aspect, the response to the user card verification may be displayed to the user on the user device 120.

The service provider 180, in one embodiment, is adapted to store information related to user card verification (block 446). In various implementations, user information, merchant information, and various other transaction information related to the processed transaction may be stored as part of the user account and/or merchant account in the account database 190, in accordance with the description of method 200 of FIG. 2. The service provider 180 may be adapted to monitor, track, log, display, and/or store transaction information, such as card verification data and information, related to online electronic commerce between the user device 120, each merchant 140, and/or the service provider 180. The stored transaction information may be accessible over the network 150 by the service provider 180 from the databases 196 for assessment, analysis, maintenance, and settlement.

Figure 5:
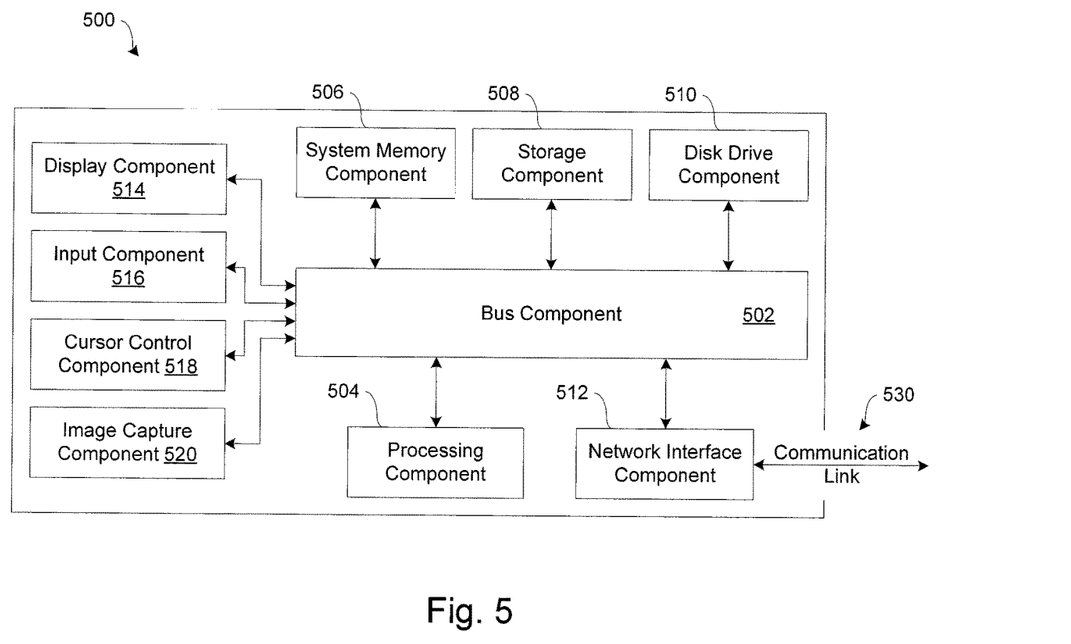
FIG. 5 shows a block diagram of a computer system suitable for implementing one or more embodiments of the present disclosure.

FIG. 5 is a block diagram of a computer system 500 suitable for implementing various embodiments of the present disclosure, including the user device 120, the merchant devices 140, the issuer devices 160, and the service provider device 180. In various implementations, the user device 120 may comprise a network communication device (e.g., mobile cellular phone, laptop, personal computer, etc.) capable of communicating with the network 150, the merchant devices 140 may comprise a network computing device (e.g., a network server), the issuer devices 160 may comprise a network computing device (e.g., a network server), and the service provider device 180 may comprise a network computing device (e.g., a network server). In other implementations, it should be appreciated that the merchant devices 140, the issuer devices 160, and the service provider device 180 may comprise a network communication device (e.g., mobile cellular phone, laptop, personal computer, etc.) capable of communicating with the network 150, without departing from the scope of the present disclosure. Accordingly, it should be appreciated that each of the devices 120, 140, 160, 180 may be implemented as the computer system 500 for communication with the network 150 in a manner as follows.

In accordance with various embodiments of the present disclosure, computer system 500, such as a mobile communication device and/or a network server, includes a bus 502 or other communication mechanism for communicating information, which interconnects subsystems and components, such as processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., CRT or LCD), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of or in combination with software instructions to implement the present disclosure.

Logic may be encoded in a computer readable medium, which may refer to any medium that participates in providing instructions to processor 504 for execution. Such a medium may take many forms, including but not limited to, non-volatile media and volatile media. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 530 (e.g., network 150 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein showings therein are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A method, comprising:
  maintaining, by a service provider computer system, a plurality of user accounts including a particular user account for a particular user;

receiving, by the service provider computer system from a user device associated with the particular user, a link request to link a transaction instrument to the particular user account such that the transaction instrument can be used in transactions involving the particular user account;

in response to the link request, the service provider computer system verifying whether the particular user is authorized to conduct transactions with merchant systems using the transaction instrument, wherein the verifying includes:

sending, to an authentication computer system, an enrollment request, wherein the enrollment request includes a request to verify enrollment of the transaction instrument in an authentication protocol in which the particular user is to provide valid authentication credentials linked to the transaction instrument;

in response to the enrollment request, receiving, from the authentication computer system, a confirmation of enrollment and issuer information for directing the user device to an issuer computer system that is configured to identify, to the authentication computer system, whether the particular user is authorized to use the transaction instrument based on whether the particular user provides valid authentication credentials associated with the transaction instrument, wherein the authentication computer system is operated by a different entity than the issuer computer system;

sending, to the authentication computer system, a validate request to validate whether the particular user has provided valid authentication credentials to the issuer computer system; and receiving, from the authentication computer system, a response that indicates whether the particular user has provided valid authentication credentials to the issuer computer system.

2. The method of claim 1, wherein the issuer information includes a uniform resource locator (URL) for the issuer computer system.

3. The method of claim 1, further comprising:
processing, by the service provider computer system, a transaction between the particular user and a merchant, wherein the processing includes permitting the transaction instrument to be used in the transaction based on determining that the particular user provided valid authentication credentials to the issuer computer system.

4. The method of claim 1, further comprising:
in response to determining that the particular user provided valid authentication credentials to the issuer computer system, the service provider computer system:
linking the transaction instrument to the particular user account; and
sending a message to the particular user via the user device to notify the particular user that the transaction instrument is linked to the particular user account.

5. The method of claim 1, further comprising:
in response to determining that the particular user provided valid authentication credentials to the issuer computer system, the service provider computer system increasing a spending limit associated with the particular user account.

6. The method of claim 1, wherein the link request to link the transaction instrument to the particular user account is received as part of processing a transaction between the particular user and a merchant.

7. The method of claim 1, wherein sending the enrollment request includes calling a lookup application programming interface (API) that is supported by the authentication computer system, and wherein sending the validate request includes calling a validate API that is supported by the authentication computer system.

8. A non-transitory computer readable medium having program instructions stored thereon that are executable by a service provider computer system to perform operations comprising:

maintaining a plurality of user accounts including a particular user account for a particular user;

receiving, from a user device associated with the particular user, a link request to link a transaction instrument to the particular user account such that the transaction instrument can be used in transactions involving the particular user account;

in response to the link request, verifying whether the particular user is authorized to use the transaction instrument in transactions, wherein the verifying includes:

sending, to an authentication computer system, an enrollment request, wherein the enrollment request includes a request to verify enrollment of the transaction instrument in an authentication protocol in which the particular user is to provide valid authentication credentials linked to the transaction instrument;

in response to the enrollment request, receiving, from the authentication computer system, issuer information for directing the user device to an issuer computer system that is configured to identify, to the authentication computer system, whether the particular user is authorized to use the transaction instrument based on whether the particular user provides valid authentication credentials associated with the transaction instrument, wherein the authentication computer system is operated by a different entity than the issuer computer system;

sending, to the authentication computer system, a validate request to validate whether the particular user has provided valid authentication credentials to the issuer computer system; and receiving, from the authentication computer system, a response that indicates whether the particular user has provided valid authentication credentials to the issuer computer system.

9. The non-transitory computer readable medium of claim 8, wherein the issuer information includes a uniform resource locator (URL) for the issuer computer system.

10. The non-transitory computer readable medium of claim 8, wherein the enrollment request includes a number associated with the transaction instrument and a name of the particular user.

11. The non-transitory computer readable medium of claim 8, wherein the operations further comprise:
in response to determining that the particular user did not provide valid authentication credentials to the issuer computer system, preventing the transaction instrument from being associated with the particular user account.

12. The non-transitory computer readable medium of claim 8, wherein the operations further comprise:

in response to determining that the particular user provided valid authentication credentials to the issuer computer system, increasing a withdrawal limit that is associated with the particular user account.

13. The non-transitory computer readable medium of claim 8, wherein the link request to link the transaction instrument to the particular user account is received prior to processing a transaction between the particular user and a merchant.

14. A system, comprising:
at least one processor; and
memory having program instructions stored thereon that are executable by the at least one processor to cause the system to perform operations comprising:
    maintaining a plurality of user accounts including a particular user account for a particular user;
    determining, based on a risk policy, to verify a transaction instrument associated with the particular user;
    verifying whether the particular user is authorized to use the transaction instrument in transactions, wherein the verifying includes:
        sending, to an authentication computer system, an enrollment request, wherein the enrollment request includes a request to verify enrollment of the transaction instrument in an authentication protocol in which the particular user is to provide valid authentication credentials linked to the transaction instrument;
        in response to the enrollment request, receiving, from the authentication computer system, issuer information for directing a user device of the particular user to an issuer computer system that is configured to identify, to the authentication computer system, whether the particular user is authorized to use the transaction instrument based on whether the particular user provides valid authentication credentials associated with the transaction instrument, wherein the authentication computer system is operated by a different entity than the issuer computer system;
        sending, to the authentication computer system, a validate request to validate whether the particular user has provided valid authentication credentials to the issuer computer system; and
        receiving, from the authentication computer system, a response that indicates whether the particular user has provided valid authentication credentials to the issuer computer system.

15. The system of claim 14, wherein the issuer information includes a uniform resource locator (URL) for the issuer computer system.

16. The system of claim 14, wherein the operations further comprise:
    in response to determining that the particular user provided valid authentication credentials to the issuer computer system:
        linking the transaction instrument to the particular user account; and
        processing, using the transaction instrument, a transaction between the particular user and a merchant.

17. The system of claim 16, wherein the operations further comprise:
    sending a message to the particular user via the user device to notify the particular user that the transaction instrument is linked to the particular user account.

18. The system of claim 14, wherein the operations further comprise:
    in response to determining that the particular user provided valid authentication credentials to the issuer computer system, increasing a spending limit associated with the particular user account.

* * * * *